United States Patent [19]
Conley et al.

[11] 3,854,971
[45] Dec. 17, 1974

[54] SATIN WHITE-CLAY COMPOSITIONS AND METHODS OF MANUFACTURE

[75] Inventors: Robert F. Conley, Elizabeth, N.J.; Billy Reid Catherwood, Macon, Ga.; Mary Kate Lloyd, Elizabeth, N.J.

[73] Assignee: Georgia Kaolin Company, Elizabeth, N.J.

[22] Filed: Apr. 17, 1968

[21] Appl. No.: 721,955

[52] U.S. Cl............. 106/214, 106/288 B, 106/306, 106/308 C, 117/156
[51] Int. Cl............................................. C08b 27/02
[58] Field of Search......... 106/214, 309, 306, 288 I, 106/308 C; 117/156

[56] References Cited
UNITED STATES PATENTS

| | | | |
|---|---|---|---|
| 1,407,773 | 2/1922 | Ryan | 106/214 |
| 2,034,519 | 3/1936 | Larson | 106/306 |
| 2,435,600 | 2/1948 | Rafton | 106/306 |
| 3,372,043 | 3/1968 | Fanselow | 106/309 X |

*Primary Examiner*—Lorenzo B. Hayes
*Attorney, Agent, or Firm*—Buell, Blenko and Ziesenheim

[57] ABSTRACT

A method of making a paper coating pigment by forming a satin white in aqueous suspension, adding thereto a kaolinite and removing a major portion of the water from the aqueous suspension to form a free flowing powder.

9 Claims, 3 Drawing Figures

INVENTORS
Robert F. Conley,
Billy Reid Catherwood
and Mary Kate Lloyd ns and to improvements in optical properties of coated paper by application of specific satin white-clay compositions thereto. More specifically, this invention relates to the processing of improved satin white-clay pigments used in the coating of paper and to an improved coating pigment.

In the commercial operation of coating paper, dispersions of kaolinite and adhesive, along with other pigments usually of high refractive index, are roll or blade coated onto a moving paper sheet and dried thereon. It has been observed that the presence of micro-voids in the dried coating improve certain optical properties, notably opacity and gloss, and to a lesser extent brightness and whiteness. One mode of introduction of controlled voids is by the use of certain acicular pigments in small concentrations. It has been theorized that such pigments take up space by "brush pile" configuration and slowly release water during the drying process and thus introduce voids of a size related to the particle length.

One such material is known in the trade as "Satin White," a calcium sulfo-aluminate of somewhat indefinite composition, but believed to be primarily 3 CaO.$Al_2O_3$.3 $CaSO_4$.32 $H_2O$. Satin White, as now known in the trade, is produced by mixing a solution of calcium hydroxide with one of aluminum sulfate in stoichiometric proportions. The chief problem in the manufacture of satin white is stability — it must be kept in water suspension, usually at about 20–25 percent solids. It is well recognized that drying satin white destroys it together with the useful optical properties it imparts. It is observed that the suspension is even degraded at temperatures above 75° C. While 75–80 percent water may be higher than necessary for its stability, the extremely thixotropic viscosity of satin white in water makes it completely impractical to handle at solids higher than 25 percent. The high water content introduces several commerical problems. Shipping costs are exorbitant and shipping is prohibited where exposure to cold weather results. The latter problem arises because freezing of the water in satin white also destroys the pigmentary characteristics. The "extra" water in satin white may dilute the coating composition and require additional drying time and costs for its removal.

We have found that premixing of satin white and kaolinite and drying thereafter gives rise to a handleable, powdery material whose properties are not only not degenerated, but actually improved over the freshly formulated components. The invention will be more clearly set forth in the following detailed examples.

EXAMPLE 1

A satin white composition is formulated by slurrying 5 parts of high purity lime in 75 parts water at room temperature and thoroughly mixing. A second solution of 25 percent aluminum sulfate is made up, a volume corresponding to about a $Al_2(SO_4)_3$.18 $H_2O$ / $Ca(OH)_2$ weight ration of 1.50. The aluminum sulfate solution is added slowly (about 30 minutes total) to the lime solution, so the temperature of the mixture does not rise above about 32° C. The precipitation is continued until a pH of 11.9 is reached. Thereafter a starch suspension is added in an amount corresponding to 10 percent by weight of the precipitated calcium alumino-sulfate, or about 1.35 parts dry starch based on lime formulation. Starch acts as a binder in the finished coating formulation and its addition to satin white improves the rheology somewhat.

The precipitate is filtered under pressure to attain 20–25 percent solids.

EXAMPLE 2

A commercial coating grade kaolinite which had been previously acid flocced, filtered, and dried (median particle size $0.7\mu$ 85 percent $<2\mu$) was formulated at about 50 percent solids in water without dispersant.

EXAMPLE 3

To this suspension of clay from Example 2 was added the satin white of Example 1 in a proportion corresponding to 70 parts dry kaolinite and 30 parts dry satin white. The composite material was about 30 percent solids. The slurry was divided into three parts.

Part A was dried as formulated in an oven at 50° C. overnight.

Part B was vacuum filtered and oven dried at 50° C. overnight.

Part C was spray dried in a Nichols Niro Utility spray dryer having an inlet gas temperature of 380° C. and an outlet gas temperature of 135° C. While this temperature is much higher than the oven drying temperature, the contact time is only a few seconds.

Properties of the various mixtures and components in Example 3 are given in Table I.

TABLE I

| Sample | Formulated Solids, % | Brookfield Viscosity, c.p. | |
|---|---|---|---|
| | | 10 RPM | 100 RPM |
| Satin White | 23 (max.) | 8,400 | 1,400 |
| Kaolinite Clay | 54 (max.) | 288 | 67 |
| (A) 70% K–30% S.W. | 39 | >10,000* | —* |
| (B) do. | 39 | >10,000* | —* |
| (C) do. | 39 | 3,680 | 476 |
| (D) do. fresh | 40 | 11,200 | 2,140 |

* Oven dried samples could not be fully redispersed due to the presence of cemented aggregates.

It is apparent that Sample C is better, with respect to rheology, than B or A, and even better than a freshly formulated composite. Sample C is a free flowing, dry-appearing powder containing about 5.0 percent moisture. All spray dried materials referred to later made by this general process contain 5 percent or less moisture and are also free flowing powders which show no degradation after several weeks aging.

The samples in Table I, except for A and B, were formulated into standardized coating compositions and coated onto a standardized paper rawstock sheet. The optical properties of the finished sheets are given in Table II.

TABLE II (a)

Optical Properties of Uncalendered Sheets

| Sample | Coating Weight lb./ream | Gloss % at 75° | Brightness at 457 mµ, % | Whiteness Index, %[1] | Opacity, %[2] |
|---|---|---|---|---|---|
| Satin White | 5 | 2.4 | 71.7 | 26.7 | 93.3 |
| Kaolinite Clay | 5 | 4.6 | 73.2 | 26.9 | 93.7 |
| (C) 70% K-30% S.W. | 4.5 | 3.0 | 75.3 | 22.3 | 95.5 |
| (D) 70% K-30% S.W. fresh | 4.5 | 2.0 | 72.8 | 26.8 | 94.0 |

[1] Reflectance difference, 700 mµ – 400 mµ
[2] Reflectance difference at 530 mµ over white/black The optical properties of Sample C are noticeably better than a freshly formulated equivalent mixture. (Note: While an increase in value in most columns signifies an improvement, a low value for whiteness index is indicative of quality. A difference of 1 percent in any of the optical properties is significant in optical character.) While gloss is better on the straight satin white, such a formulation is not practical from its rheological, printing, drying, and accessory optical properties.

EXAMPLE 4

Samples of 70–30 blends respectively of kaolinite and satin white were formulated similarly to Example 3 with varying dispersants. Stability tests were performed using viscosity measurements as a criterion. The results are illustrated in the accompanying drawings in which.

The composites predispersed with mixtures of sodium hexametaphosphate and organic phosphonates such as "Dequest." ("Dequest" is the trade mark of Monsanto Chemical Company for its brand of amino tri (methylphosphonic acid) and the salts thereof) show the lowest initial viscosities and maintain a low level for an extended period. Such properties are essential for commercial processing. In spray drying a slurry is pumped through fine nozzles and atomized in a hot air stream. A low viscosity and high solids are absolutely essential for economic operation of such dryers. Also, in commercial operation it is not always feasible to spray dry a slurry immediately upon its formulation. It is common practice to integrate many production batches into a holding tank to minimize inconsistencies and to balance out equipment throughput rates. Consequently, the rheological stability of a slurry is of considerable importance.

EXAMPLE 5

Samples similar in composition and formulation as set forth in Example 4 were dried on the commercial spray dryer to evaluate the effect of the initial dispersant and spray drying on finished coating properties. Preparation was similar to Sample C except a minimum dispersant level was employed to achieve pumping requirements for the spray dryer. Coated sheets were prepared with a slight starch modification of those in Example 3. The results appear in Table III.

TABLE III (a)

Physical Properties of Predispersed & Spray Dried Formulations

| Sample | | Dispersing Agent | % Solids* | pH* | Brookfield Viscosity, cps* | |
|---|---|---|---|---|---|---|
| | | | | | 10 RPM | 100 |
| (E) | 70% K - 30% S.W. | None | 39.7 | 9.6 | 4160 | 840 |
| (F) | do. | 0.25% (NaPO$_3$)$_6$ | 39.6 | 9.5 | 5200 | 848 |
| (G) | do. | 0.2% (NaPO$_3$)$_6$ + 0.1% Na$_2$CO$_3$ | 39.2 | 9.5 | 4200 | 676 |
| (H) | do. | 0.2% (NaPO$_3$)$_6$ + 0.2% Dequest | 40.8 | 9.6 | 6320 | 1136 |
| (I) | 80% K - 20% S.W. | None | 39.7 | 9.4 | 1920 | 440 |
| (J) | do. | 0.25% (NaPO$_3$)$_6$ | 39.6 | 9.4 | 2800 | 584 |
| (K) | do. | 0.2% (NaPO$_3$)$_6$ + 0.1% Na$_2$CO$_3$ | 39.6 | 9.4 | 2400 | 496 |
| (L) | do. | 0.2% (NaPO$_3$)$_6$ + 0.2% Dequest | 39.4 | 9.6 | 2040 | 736 |

* of finished coating formulation

TABLE III (b)

Optical Properties of Coated Sheets after Calendering*

| Sample | Coating Weight lb./ream | Gloss % at 75° | Brightness at 457 mµ, % | Whiteness Index, % | Opacity, % |
|---|---|---|---|---|---|
| (E) | 5 | 11.6 | 73.3 | 36.4 | 90.0 |
| (F) | 5 | 15.0 | 74.8 | 32.6 | 90.5 |
| (G) | 4.5 | 12.2 | 73.9 | 34.9 | 89.9 |
| (H) | 5.5 | 17.0 | 75.2 | 32.3 | 91.4 |

TABLE III (b) — Continued

Optical Properties of Coated Sheets after Calendering*

| Sample | Coating Weight lb./ream | Gloss % at 75° | Brightness at 457 mµ, % | Whiteness Index, % | Opacity, % |
|---|---|---|---|---|---|
| (I) | 5 | 12.6 | 74.3 | 34.5 | 90.5 |
| (J) | 5 | 14.2 | 74.8 | 33.5 | 90.6 |
| (K) | 5 | 14.2 | 75.0 | 33.3 | 91.0 |
| (L) | 5 | 13.5 | 75.8 | 32.4 | 90.4 |

* 2 nips at 5 psig

Figure 1:
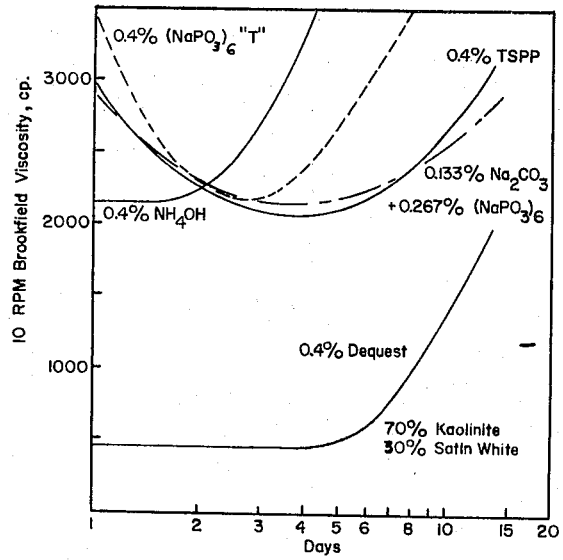
FIG. 1 is a graph of aging characteristics of 25 percent solid suspension using various dispersants.
Figure 2:
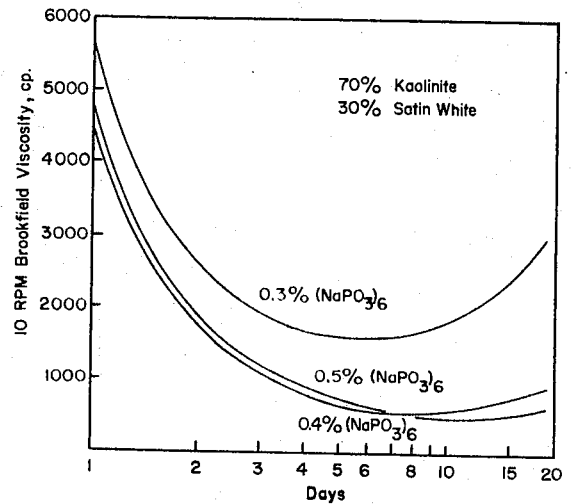
FIG. 2 is a graph as in FIG. 1 using various concentrations of sodium hexametaphosphate.
Figure 3:
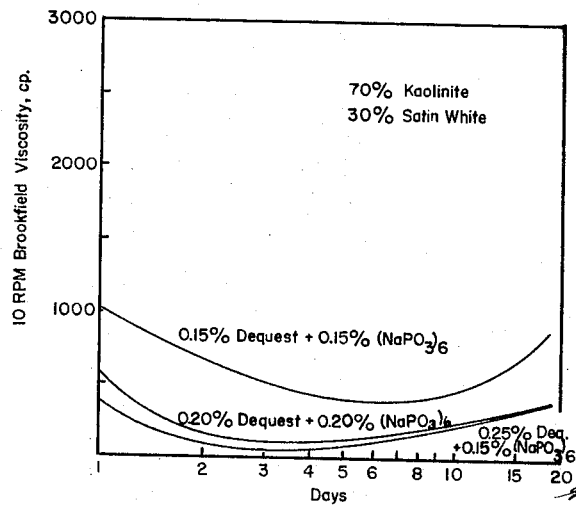
FIG. 3 is a graph as in FIG. 1 using various concentrations of sodium hexametaphosphate and Dequest.

A comparison of physical properties in Table III (a) shows that the predispersion, while reducing viscosity for the spray-dryer feed (FIG. 1), results in a slight increase in finished formulation (coating color) viscosity. While any viscosity increase is counter to good coating practice, this amount is not beyond the compensation capacity of commercial coating machines. Of even greater importance is the viscosity comparison of samples F, G, and H with D, a formulation whose viscosity is impractically high.

The optical properties in Table III (b) show an even greater advantage of predispersion in the spray drying operation. All predispersed samples are better than the straight spray dried member (in both composite ratios) in almost all optical properties.

EXAMPLE 6

Coating colors were formulated similar to those in previous examples except that an amount of titanium dioxide corresponding to 6 percent of the satin white was included. Titanium dioxide is a common pigment employed in paper coating because of its high refractive index and, hence, brightness and opacity manifesting capacity. The $TiO_2$ was introduced via the satin white and spray dried in situ. The coating properties of these formulations are given in Table IV.

TABLE IV (a)

Optical Properties of Uncalendered Sheets

| Sample | Dispersant[1] | Coating Weight lb/ream | Brightness at 457 mµ, % | Whiteness Index, % | Opacity, % |
|---|---|---|---|---|---|
| (M) Satin White | — | 6 | 75.4 | 30.8 | 90.5 |
| (N) Kaolinite | — | 6 | 74.1 | 34.4 | 91.1 |
| (O) 70% K-30% S. W.[2] | none[3] | 6 | 75.7 | 30.9 | 91.2 |
| (P) 70% K-30% S.W.[2] | 0.2% Dequest 0.2% $(NaPO_3)_6$ | 6 | 76.2 | 29.6 | 91.9 |
| (Q) 70% K-30% S.W.[2] | 0.3% $NH_4OH$ | 6 | 75.5 | 31.2 | 91.5 |
| (R) 70% K-30% S.W.[2] | 0.3% $Na_4P_2O_7$ | 6 | 75.2 | 31.6 | 90.8 |
| (S) 80% K-20% S.W.[4] | none[3] | 6 | 75.4 | 31.0 | 91.6 |
| (T) 80% K-20% S.W.[4] | 0.2% $(NaPO_3)_6$ 0.1% $Na_2CO_3$ 0.2% Dequest | 6.3 | 75.9 | 29.9 | 91.4 |
| (U) 80% K-20% S.W.[4] | 0.2% $(NaPO_3)_6$ | 6 | 76.6 | 27.8 | 92.5 |

[1] added prior to spray drying
[2] actual pigment composition: kaolinite = 66.8%, satin white = 28.6%, $TiO_2$ = 1.7%, oxidized starch = 2.9%
[3] 0.2% Dequest + 0.2% $(NaPO_3)_6$ added to coating formulation after spray drying
[4] actual pigment composition: Kaolinite = 77.6%, satin white = 19.4%, $TiO_2$ = 1.1%, starch = 1.9%

TABLE IV (b)

Optical Properties of Coated Sheets after Calendering*

| Sample | Gloss % at 75° | Brightness at 457 mµ, % | Whiteness Index, % | Opacity, % |
|---|---|---|---|---|
| (M) | 29.0 | 74.9 | 31.4 | 90.1 |
| (N) | 13.0 | 73.9 | 34.3 | 91.3 |
| (O) | 14.0 | 75.0 | 32.0 | 91.0 |
| (P) | 18.3 | 75.1 | 31.5 | 91.2 |
| (Q) | 16.0 | 74.1 | 33.6 | 91.0 |
| (R) | 16.7 | 74.5 | 33.2 | 90.1 |
| (S) | 16.8 | 74.1 | 33.3 | 91.0 |
| (U) | 19.6 | 75.0 | 31.0 | 91.9 |

* 2 nips at 5 psig

While dispersion prior to spray drying with tetrasodium pyrophosphate or sodium hexametaphosphate-sodium carbonate yields a material having improved optical coating properties, the superiority in optical properties obtained by predispersion with mixtures of sodium hexametaphosphate and Dequest is clearly evident.

In the foregoing specification we have set out certain preferred practices and embodiments of our invention, however, it will be understood that this invention may be otherwise embodied within the scope of the following claims.

We claim:

1. The method of producing an improved dry particulate coating pigment containing satin white and kaolin which after drying may subsequently be made up into aqueous coating compositions the steps of:
   a. forming a satin white composition in aqueous suspension;
   b. adding a kaolinite to said aqueous suspension of satin white in sufficient amount to retain the effectiveness of satin white as a paper coating pigment on rewetting after drying; and
   c. removing water from the aqueous suspension to form a free flowing powder.

2. The method as claimed in claim 1 wherein the kaolinite is added as an aqueous suspension.

3. The method as claimed in claim 1 wherein a paper coating adhesive starch is added to said admixture prior to drying.

4. The method as claimed in claim 1 wherein the clay is predispersed with a sufficient amount of alkali metal polyphosphates to disperse the clay in said aqueous suspension.

5. The method as claimed in claim 1 wherein the mixture is predispersed by the addition of an effective amount to disperse the mixture up to about 1 percent by weight of a mixture of sodium hexametaphosphate and sodium carbonate in a ratio of about 2:1 based on the solids in the mixture.

6. The method as claimed in claim 1 wherein the mixture is predispersed by the addition of an effective amount to disperse the mixture up to about 1 percent by weight of a mixture of sodium hexametaphosphate and organic phosphonate based on the solids in the mixture.

7. The method as claimed in claim 1 wherein the water is removed by spray drying to a level of about 5 percent.

8. A dry particulate composition suitable for subsequent formulation in paper coating colors comprising a co-dried mixture of satin white and kaolinite of about 5 percent moisture content.

9. A paper coating composition as claimed in claim 8 having incorporated therein paper coating adhesive starch sufficient to provide adhesive qualities.

* * * * *

UNITED STATES PATENT OFFICE
CERTIFICATE OF CORRECTION

Patent No. 3,854,971          Dated December 17, 1974

Inventor(s) ROBERT F. CONLEY et al.

It is certified that error appears in the above-identified patent and that said Letters Patent are hereby corrected as shown below:

Table II (b) should be inserted after Table II (a) to read:

TABLE II (b)

OPTICAL PROPERTIES OF COATED SHEETS AFTER CALENDERING*

| Sample | Gloss %@ 75 | Brightness @457m$\mu$, % | Whiteness Index, % | Opacity % |
|---|---|---|---|---|
| Satin White | 27.2 | 69.5 | 30.8 | 93.4 |
| Kaolinite Clay | 24.1 | 72.0 | 28.3 | 93.3 |
| (C) 70% K-30% S.W. | 25.0 | 72.9 | 25.5 | 94.9 |
| (D) 70% K-30% S. W. fresh | 21.0 | 71.2 | 28.7 | 93.4 |

*Two nips at five psig

In Table IV (b)-Continued, Sample T should be inserted after Sample S, to read:

| (T) | 16.4 | 74.7 | 32.0 | 91.8 |

Column 6, Claim 1, line 28, after "compositions" insert --comprising--.

Signed and Sealed this twenty-seventh Day of January 1976

[SEAL]

Attest:

RUTH C. MASON
Attesting Officer

C. MARSHALL DANN
Commissioner of Patents and Trademarks